(12) United States Patent
Nishide

(10) Patent No.: US 6,581,969 B2
(45) Date of Patent: Jun. 24, 2003

(54) BUCKLE DEVICE

(75) Inventor: Seiji Nishide, Hiwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/984,336

(22) Filed: Oct. 29, 2001

(65) Prior Publication Data
US 2002/0050707 A1 May 2, 2002

(30) Foreign Application Priority Data
Oct. 31, 2000 (JP) ........................... 2000-332405

(51) Int. Cl.⁷ ............................................. B60R 22/26
(52) U.S. Cl. ..................................................... 280/801.1
(58) Field of Search .............................. 24/684, 801.1, 24/801.2, 808; 297/468

(56) References Cited

U.S. PATENT DOCUMENTS

| | | | |
|---|---|---|---|
| 4,132,434 A | * | 1/1979 | Takahashi et al. ........... 297/481 |
| 5,236,220 A | * | 8/1993 | Mills ........................ 280/801.1 |
| 5,332,261 A | * | 7/1994 | Siepierski .................. 280/801.1 |
| 5,855,047 A | | 1/1999 | Haas |
| 6,513,880 B2 | * | 2/2003 | Yamaguchi et al. ........ 297/468 |

FOREIGN PATENT DOCUMENTS

| | | | |
|---|---|---|---|
| DE | 3807927 A1 | * | 9/1989 |
| JP | 2-164642 | | 6/1990 |
| JP | 5-105028 | * | 4/1993 |

* cited by examiner

Primary Examiner—Paul N. Dickson
Assistant Examiner—Ruth Ilan
(74) Attorney, Agent, or Firm—Nixon Peabody LLP; Thomas W. Cole

(57) ABSTRACT

The present invention relates to a buckle device in which usability and seating comfort of a vehicle occupant on a seat are improved, and which can correspond to seat movements. In the buckle device, due to a torsion coil spring applying urging force to a buckle member, the buckle member is disposed at a swiveling position at which the buckle member stands. In this way, when a tongue plate is inserted into a buckle, there is no need for a vehicle occupant to hold the buckle with his/her hand. Moreover, when a vehicle occupant sits down on a rear seat, the buckle is pushed downward against the urging force and is accommodated in the rear seat. Further, when a seat movement is carried out on the rear seat, the buckle member swivels against the urging force so as to be able to correspond to the seat movement.

14 Claims, 8 Drawing Sheets

BUCKLE DEVICE

BACKGROUND OF THE INVENTION

1. Field of the Invention

The present invention relates to a buckle device having a buckle into which is inserted a tongue plate which is attached to a webbing for restraining a vehicle occupant.

2. Description of the Related Art

Conventional buckle devices for the rear seat of a vehicle have, for example, a buckle. The buckle is disposed on the rear seat via a webbing for setting the buckle at the seat. A tongue plate, which is attached to a webbing for restraining a vehicle occupant, is inserted into the buckle. (Hereinafter, such a buckle device will be called a "webbing-type buckle device".)

However, in this webbing-type buckle device, the buckle is only disposed on the rear seat via the webbing for setting the buckle at the seat. Thus, the position of the buckle at the rear seat is unstable. Therefore, the vehicle occupant must hold the buckle with his/her hand when inserting the tongue plate into the buckle, and a problem arises in that usability is poor.

Further, because the buckle forms a convex portion on the rear seat, the buckle abuts the buttocks of the vehicle occupant, and a problem arises in that the seating comfort of the vehicle occupant is poor.

Moreover, there are the problems that the accommodating of the buckle and the webbing for setting the buckle at the seat are poor, and the appearance thereof is poor.

There are buckle devices having a structure in which the buckle is placed in a standing state at the rear seat in order to facilitate insertion of the tongue plate into the buckle and in order to improve usability. (Such a buckle device is called a "self-standing type buckle device" hereinafter.)

However, in a self-standing type buckle device, the buckle cannot slide in the vertical direction of the vehicle (the direction substantially perpendicular to the top surface of the rear seat) at the rear seat. Thus, a problem arises in that, when the vehicle occupant sits down, the buttocks of the vehicle occupant abut the buckle which is projecting from the rear seat, and the seating comfort of the vehicle occupant is poor.

Further, in a self-standing type buckle device, when a seat movement, such as the operation of sliding the rear seat or the operation of reclining the rear seat or the like, is carried out, it is preferable that the buckle be able to rotate in correspondence with the seat movement.

SUMMARY OF THE INVENTION

In view of the aforementioned, an object of the present invention is to provide a buckle device in which the usability and the seating comfort of the vehicle occupant on the seat are improved, and which can correspond to seat movements.

A first aspect of the present invention is a buckle device which is disposed at a seat in a vehicle, and into which a tongue plate, which is attached to a webbing for restraining a vehicle occupant, is inserted, the buckle device comprising: a buckle member having, at an upper portion of the buckle member, a buckle into which the tongue plate is inserted, and having, at a lower portion of the buckle member, a linking portion at which a columnar rotating shaft is disposed; a supporting member which is fixed within the vehicle so as to correspond to the buckle member, and in which an elongated hole is formed along a vertical direction of the vehicle, and due to the rotating shaft being inserted through the elongated hole, the linking portion is enabled to swivel around the rotating shaft such that the buckle member can swivel, and the rotating shaft is movable between an upper end and a lower end of the elongated hole so that the supporting member supports the buckle member slidably; an abutment portion which is provided at the supporting member, and which abuts the buckle member and prevents swiveling of the buckle member in a state in which the buckle member is at a swiveling position at which the buckle member stands; a torsion coil spring having a helical spring portion, the rotating shaft being inserted through an interior of the spring portion, and a first end portion of the torsion coil spring being retained at the buckle member; and an engagement portion which is provided at the supporting member, and due to a second end portion of the torsion coil spring slidably engaging with the engagement portion, the torsion coil spring applies urging force to the buckle member and makes the rotating shaft abut the upper end of the elongated hole and makes the buckle member abut the abutment portion.

In the above-described buckle device, the buckle member has the buckle at the upper portion thereof, and has the linking portion at the lower portion thereof. Due to the rotating shaft of the linking portion being inserted through the elongated hole of the supporting member, the supporting member supports the buckle member such that the buckle member can slide and swivel.

Here, due to the torsion coil spring applying urging force to the buckle member, the rotating shaft abuts the upper end of the elongated hole, and the buckle member is disposed at the position which is the upper limit of sliding. At the same time, the buckle member is abutted to the abutment portion, and the buckle member is set in a state of being disposed at a swiveling position at which the buckle member stands. In this way, when the tongue plate, which is attached to the webbing for restraining a vehicle occupant, is inserted into the buckle, there is no need for the vehicle occupant to hold the buckle with his/her hand, and the usability improves.

Moreover, when a downward pressing force of a given amount or greater is applied to the buckle member, the rotating shaft moves toward the lower end of the elongated hole against the urging force of the torsion coil spring, and the second end portion of the torsion coil spring slides on the engagement portion of the supporting member, and the buckle member is slid downward. On the other hand, when application of the downward pressing force on the buckle member is released, the buckle member returns to the position which is the upper limit of sliding (the initial position) due to the urging force of the torsion coil spring. Namely, when the vehicle occupant sits down on the seat, the buckle is pressed downward by the buttocks of the vehicle occupant, and the buckle does not project from the top surface of the seat. Thus, the seating comfort of the vehicle occupant can be improved.

Further, when swiveling force is applied to the buckle member, the buckle member swivels around the rotating shaft against the urging force of the torsion coil spring. On the other hand, when application of swiveling force to the buckle member is released, the buckle member returns to the swiveling position at which the buckle member stands (the initial position) due to the urging force of the torsion coil spring. Namely, when a seat movement, such as a sliding operation or a reclining operation or the like of the seat, is carried out, the buckle member swivels and can correspond to the seat movement.

Because the buckle member can be returned to its initial position merely by the torsion coil spring, the buckle device can be made to have a simple structure.

Moreover, here, when adjusting the anti-sliding force or the anti-swiveling force (torque) of the buckle member, it suffices to adjust the position at which the engagement portion is set at the supporting member, or to adjust the urging force of the torsion coil spring. Thus, the anti-sliding force and the anti-swiveling force can be adjusted easily.

In order to adjust the sliding length (stroke) of the buckle member, other than adjusting the length of the elongated hole formed in the supporting member, the position at which the engagement portion is set at the supporting member maybe adjusted. Thus, the sliding length can be easily adjusted. While the projecting of the second end portion of the torsion coil spring from the buckle member is suppressed, the sliding length can be made long and the buckle device can be prevented from becoming large.

The buckle device of the present invention preferably further comprises a thick portion which is formed at a peripheral edge of the elongated hole of the supporting member, and whose thickness is greater than a thickness of regions of the supporting member other than the peripheral edge of the elongated hole.

In this buckle device, the thick portion, whose thickness is greater than the thickness of regions of the supporting member other than the peripheral edge of the elongated hole, is formed at the peripheral edge of the elongated hole of the supporting member. The rigidity of the supporting member at the elongated hole can thereby be increased. Thus, even in cases such as when the elongated hole is made to be long in order to increase the sliding length of the buckle member, deformation of the supporting member (e.g., deformation such as the width of the elongated hole increasing) can be prevented.

A second aspect of the present invention is a buckle device which is disposed at a seat in a vehicle, and into which a tongue plate, which is attached to a webbing for restraining a vehicle occupant, is inserted, the buckle device comprising: a buckle member having, at an upper portion of the buckle member, a buckle into which the tongue plate is inserted, and having, at a lower portion of the buckle member, a linking portion in which an elongated hole is formed along a vertical direction of the vehicle and in which a retaining portion is formed at one of an upper side and a lower side of the elongated hole; a supporting member which is fixed within the vehicle so as to correspond to the buckle member, and provided with a rotating shaft which is inserted through the elongated hole of the linking portion, the linking portion being supported so as to swivel around the rotating shaft such that the buckle member can swivel, and the rotating shaft being movable between an upper end and a lower end of the elongated hole, so that the supporting member supports the buckle member slidably; an abutment portion which is provided at the supporting member, and which abuts the buckle member and prevents swivel of the buckle member in a state in which the buckle member is at a swiveling position at which the buckle member stands; a spring member having a torsion coil spring and a compression coil spring, the torsion coil spring having a helical spring portion, the rotating shaft being inserted through an interior of the spring portion, the compression coil spring being formed in a helical shape, one end of the compression coil spring being retained at the retaining portion, and another end of the compression coil spring being linked to a first end portion of the torsion coil spring, and the compression coil spring applies urging force to the buckle member and makes the rotating shaft abut the lower end of the elongated hole; an engagement portion which is provided at the supporting member, and due to a second end portion of the torsion coil spring engaging with the engagement portion, the torsion coil spring applies urging force to the buckle member and makes the buckle member abut the abutment portion; and a case member which is provided so as to accommodate the compression coil spring, and which prevents buckling which accompanies compression of the compression coil spring.

In the above-described buckle device, the buckle member has the buckle at the upper portion thereof, and has the linking portion at the lower portion thereof. Due to the rotating shaft of the supporting member being inserted through the elongated hole of the linking portion, the supporting member supports the buckle member such that the buckle member can slide and swivel.

Here, due to the compression coil spring of the spring member applying urging force to the buckle member, the rotating shaft abuts the lower end of the elongated hole, and the buckle member is disposed at the position which is the upper limit of sliding. Due to the torsion coil spring of the spring member applying urging force to the buckle member, the buckle member is abutted by the abutment portion, and the buckle member is set in a state of being disposed at a swiveling position at which the buckle member stands. In this way, when the tongue plate, which is attached to the webbing for restraining a vehicle occupant, is inserted into the buckle, there is no need for the vehicle occupant to hold the buckle with his/her hand, and the usability improves.

Moreover, when a downward pressing force of a given amount or greater is applied to the buckle member, the rotating shaft moves toward the upper end of the elongated hole against the urging force of the compression coil spring, and the buckle member is slid downward. On the other hand, when application of the downward pressing force on the buckle member is released, the buckle member returns to the position which is the upper limit of sliding due to the urging force of the compression coil spring. Namely, when the vehicle occupant sits down on the seat, the buckle is pressed downward by the buttocks of the vehicle occupant, and the buckle does not project from the top surface of the seat. Thus, the seating comfort of the vehicle occupant can be improved.

Further, when swiveling force is applied to the buckle member, the buckle member swivels around the rotating shaft against the urging force of the torsion coil spring. On the other hand, when application of swiveling force to the buckle member is released, the buckle member returns to the swiveling position at which the buckle member stands, due to the urging force of the torsion coil spring. In this way, when a seat movement, such as a sliding operation or a reclining operation or the like of the seat, is carried out, the buckle member swivels and can correspond to the seat movement.

Due to the compression coil spring being accommodated in the case member, buckling, which accompanies contraction of the compression coil spring, can be prevented by the case member. Thus, even in cases such as when the retaining portion of the linking portion is small and the retaining portion cannot press one end side of the compression coil spring uniformly, the proper urging force of the compression coil spring can be applied to the buckle member. Further, because the compression coil spring is accommodated in the case member, foreign matter such as dirt and the like can be prevented from adhering to the compression coil spring.

Moreover, here, when the anti-sliding force of the buckle member is to be adjusted, the position at which the retaining portion is formed at the linking portion may be adjusted, or the urging force of the compression coil spring may be adjusted. Further, when the anti-swiveling force (torque) of the buckle member is adjusted, either the position at which the engagement portion is set at the supporting member may be adjusted, or the urging force of the torsion coil spring may be adjusted. Thus, the anti-sliding force and the anti-swiveling force can easily be adjusted. Further, the anti-sliding force and the anti-swiveling force can be adjusted independently, and can be adjusted with high precision.

In order to adjust the sliding length (stroke) of the buckle member, other than adjusting the length of the elongated hole formed in the linking portion, the position at which the engagement portion is set at the supporting member may be adjusted. Thus, the sliding length can easily be adjusted. While the projecting of the second end portion of the torsion coil spring from the buckle member is suppressed, the sliding length can be made long and the buckle device can be prevented from becoming large.

A third aspect of the present invention is a buckle device which is disposed at a seat in a vehicle, and into which a tongue plate, which is attached to a webbing for restraining a vehicle occupant, is inserted, the buckle device comprising: a buckle member having, at an upper portion of the buckle member, a buckle into which the tongue plate is inserted, and having, at a lower portion of the buckle member, a linking portion in which an elongated hole is formed along a vertical direction of the vehicle and in which a retaining portion is formed at one of an upper side and a lower side of the elongated hole; a supporting member which is fixed within the vehicle so as to correspond to the buckle member, and provided with a rotating shaft which is inserted through the elongated hole of the linking portion, the linking portion being supported so as to swivel around the rotating shaft such that the buckle member can swivel, and the rotating shaft being movable between an upper end and a lower end of the elongated hole so that the supporting member supports the buckle member slidably; an abutment portion which is provided at the supporting member, and which abuts the buckle member and prevents swiveling of the buckle member in a state in which the buckle member is at a swiveling position at which the buckle member stands; a spring member having a torsion coil spring and a compression coil spring, the torsion coil spring having a helical spring portion, the rotating shaft being inserted through an interior of the spring portion, the compression coil spring being formed in a helical shape, one end of the compression coil spring being retained at the retaining portion, and another end of the compression coil spring being linked to a first end portion of the torsion coil spring, and the compression coil spring applies urging force to the buckle member and makes the rotating shaft abut the lower end of the elongated hole; an engagement portion which is provided at the supporting member, and due to a second end portion of the torsion coil spring engaging with the engagement portion, the torsion coil spring applies urging force to the buckle member and makes the buckle member abut the abutment portion; and a thick portion which is formed at a peripheral edge of the elongated hole of the linking portion, and whose thickness is greater than a thickness of regions of the linking portion other than the peripheral edge of the elongated hole.

Further, the buckle device preferably further comprises a case member which is provided so as to accommodate the compression coil spring, and which prevents buckling which accompanies compression of the compression coil spring.

In the above-described buckle device, the buckle member has the buckle at the upper portion thereof, and has the linking portion at the lower portion thereof. Due to the rotating shaft of the supporting member being inserted through the elongated hole of the linking portion, the supporting member supports the buckle member such that the buckle member can slide and swivel.

Here, due to the compression coil spring of the spring member applying urging force to the buckle member, the rotating shaft abuts the lower end of the elongated hole, and the buckle member is disposed at the position which is the upper limit of sliding. Due to the torsion coil spring of the spring member applying urging force to the buckle member, the buckle member is abutted to the abutment portion, and the buckle member is set in a state of being disposed at a swiveling position at which the buckle member stands. In this way, when the tongue plate, which is attached to the webbing for restraining a vehicle occupant, is inserted into the buckle, there is no need for the vehicle occupant to hold the buckle with his/her hand, and the usability improves.

Moreover, when a downward pressing force of a given amount or greater is applied to the buckle member, the rotating shaft moves toward the upper end of the elongated hole against the urging force of the compression coil spring, and the buckle member is slid downward. On the other hand, when application of the downward pressing force on the buckle member is released, the buckle member returns to the position which is the upper limit of sliding, due to the urging force of the compression coil spring. Namely, when the vehicle occupant sits down on the seat, the buckle is pressed downward by the buttocks of the vehicle occupant, and the buckle does not project from the top surface of the seat. Thus, the seating comfort of the vehicle occupant can be improved.

Further, when swiveling force is applied to the buckle member, the buckle member swivels around the rotating shaft against the urging force of the torsion coil spring. On the other hand, when application of swiveling force to the buckle member is released, the buckle member returns to the swiveling position at which the buckle member stands, due to the urging force of the torsion coil spring. Namely, when a seat movement, such as a sliding operation or a reclining operation or the like of the seat, is carried out, the buckle member swivels and can correspond to the seat movement.

Moreover, when the anti-sliding force of the buckle member is to be adjusted, the position at which the retaining portion is formed at the linking portion may be adjusted, or the urging force of the compression coil spring may be adjusted. Further, when the anti-swiveling force (torque) of the buckle member is adjusted, either the position at which the engagement portion is set at the supporting member may be adjusted, or the urging force of the torsion coil spring maybe adjusted. Thus, the anti-sliding force and the anti-swiveling force can easily be adjusted. Further, the anti-sliding force and the anti-swiveling force can be adjusted independently, and can be adjusted with high precision.

In order to adjust the sliding length (stroke) of the buckle member, other than adjusting the length of the elongated hole formed in the linking portion, the position at which the engagement portion is set at the supporting member may be adjusted. Thus, the sliding length can easily be adjusted. While the projecting of the second end portion of the torsion coil spring from the buckle member is suppressed, the sliding length can be made long and the buckle device can be prevented from becoming large.

The thick portion, whose thickness is greater than the thickness of regions of the linking portion other than the peripheral edge of the elongated hole, is formed at the peripheral edge of the elongated hole of the linking portion. Therefore, the rigidity of the linking portion at the elongated hole can be increased. Thus, even in cases such as when the elongated hole is made long in order to increase the sliding length of the buckle member, deformation of the linking portion (e.g., deformation such as the width of the elongated hole increasing) can be prevented.

DESCRIPTION OF THE PREFERRED EMBODIMENTS

First Embodiment

Figure 1:
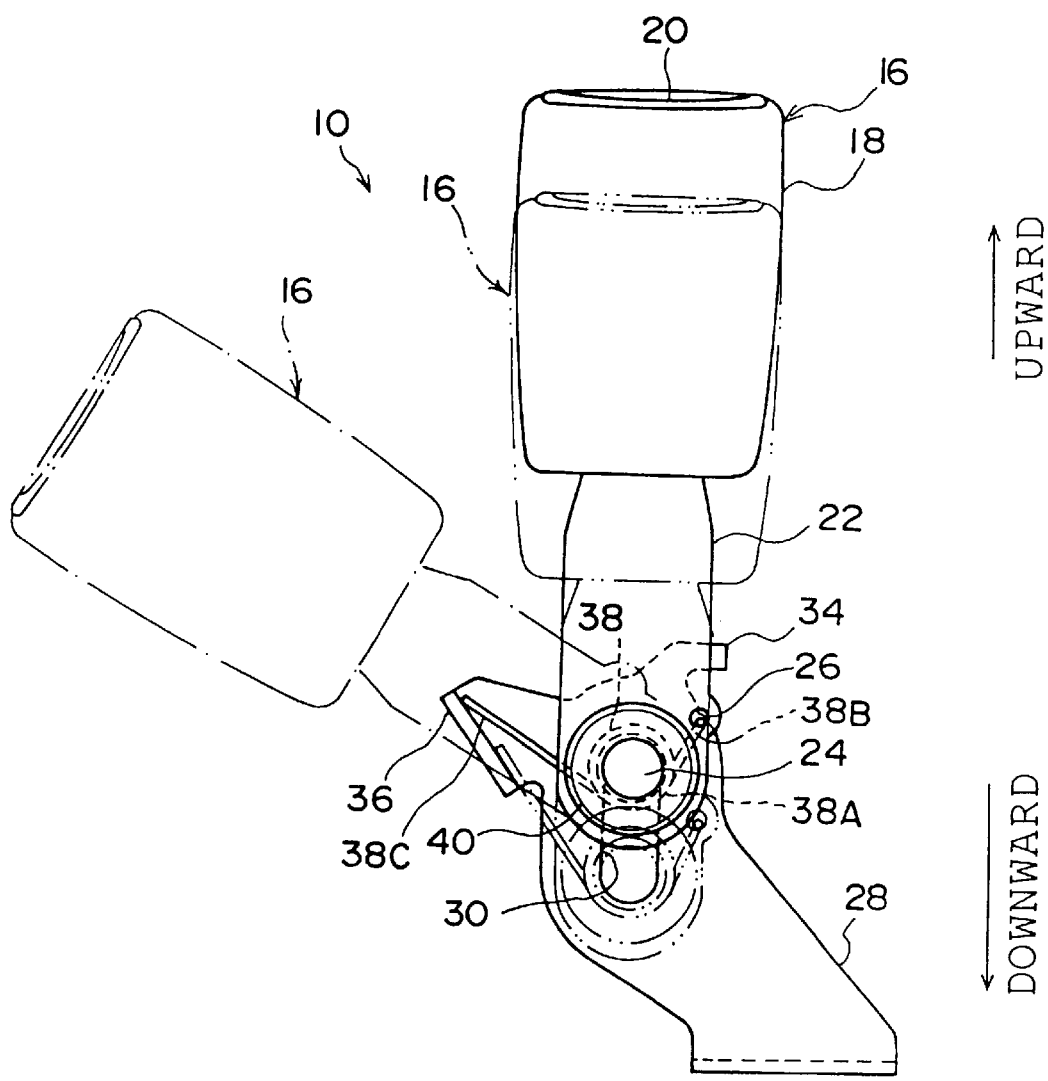
FIG. 1 is a side view, as seen from a side of a vehicle, showing a buckle device relating to a first embodiment of the present invention.
Figure 2:
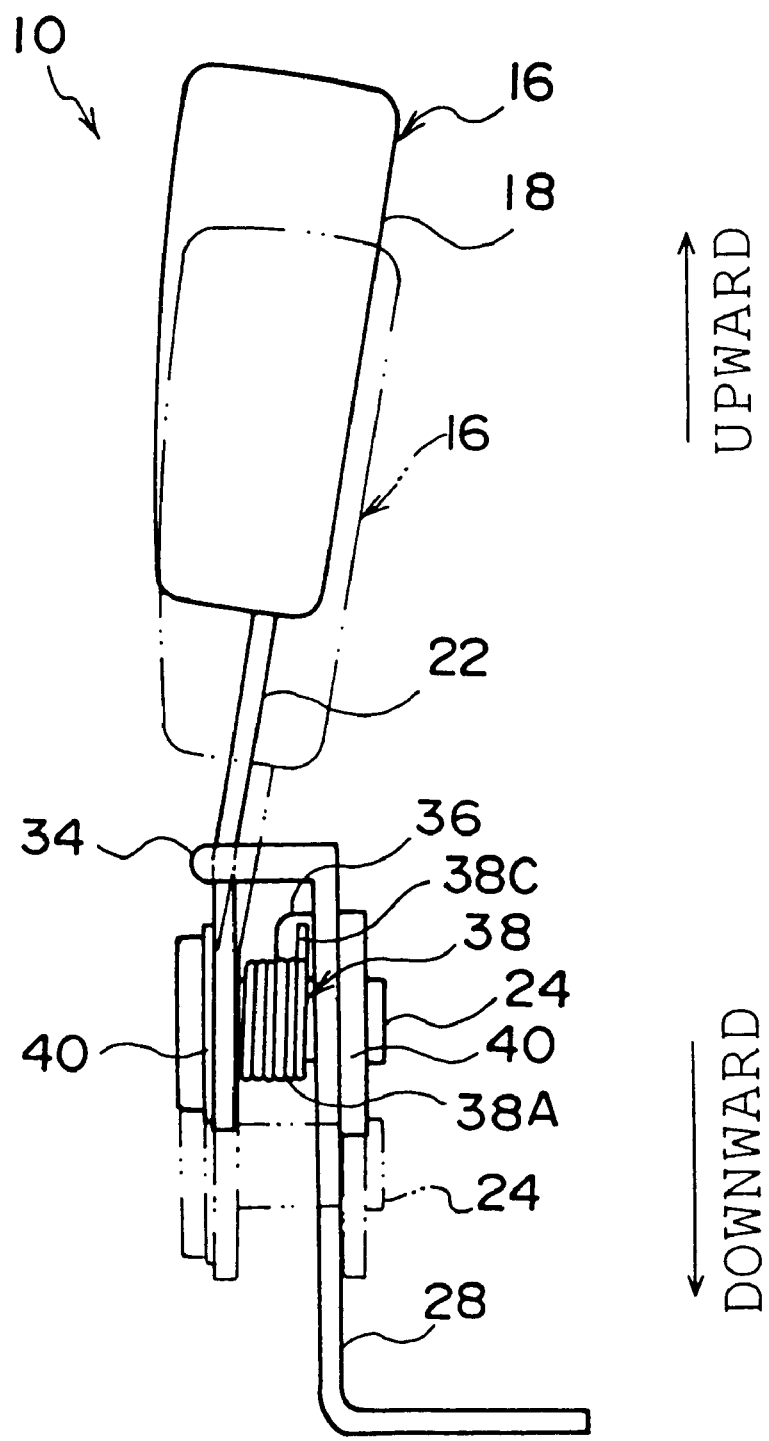
FIG. 2 is a side view, as seen from the front of the vehicle, showing the buckle device relating to the first embodiment of the present invention.
Figure 3:
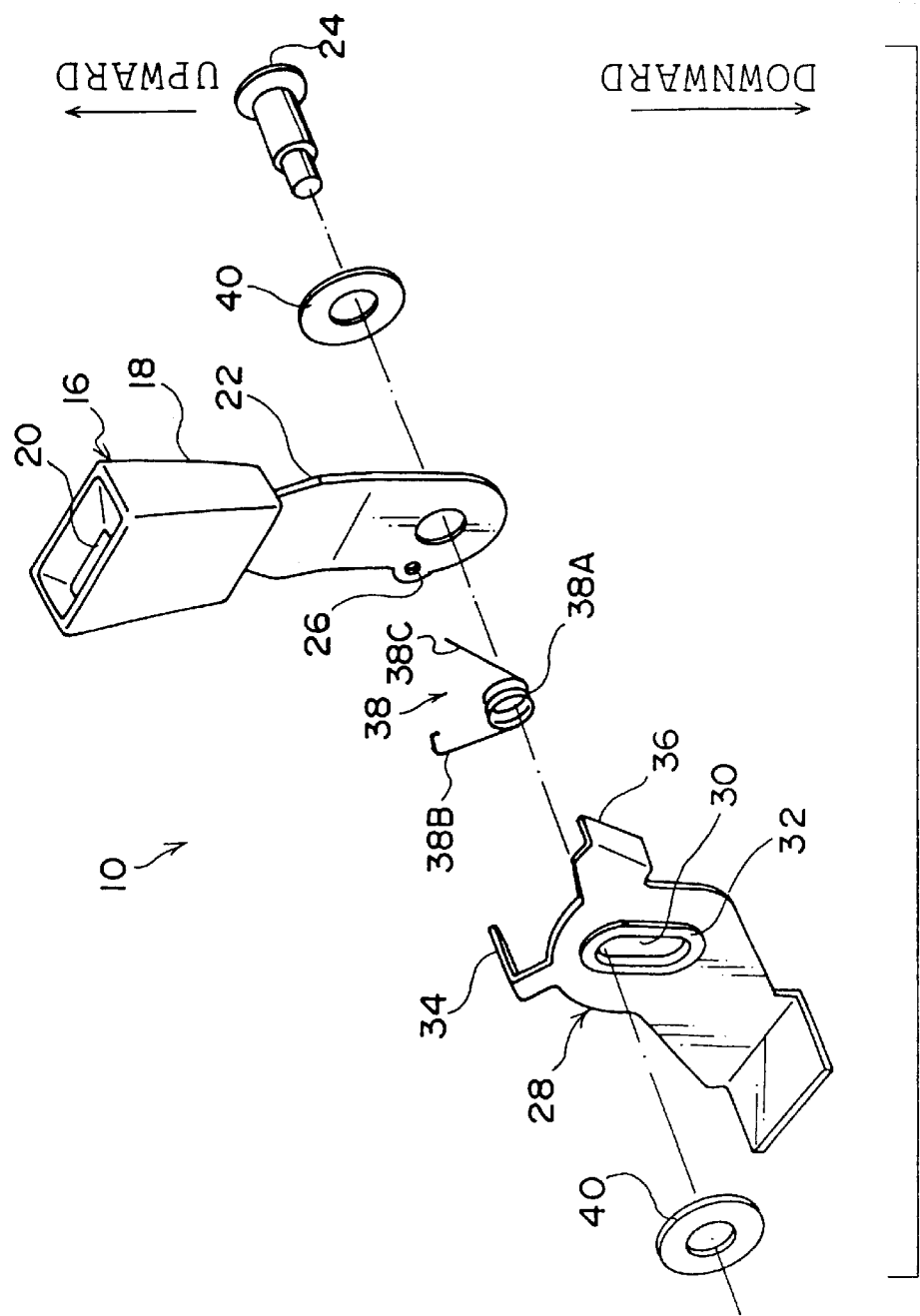
FIG. 3 is an exploded perspective view showing the buckle device relating to the first embodiment of the present invention.

A buckle device 10 relating to a first embodiment of the present invention is shown in FIG. 1 in a side view seen from a side of a vehicle. The buckle device 10 is shown in FIG. 2 in a side view seen from the front of the vehicle. Further, the buckle device 10 is shown in an exploded perspective view in FIG. 3, and a state in which the buckle device 10 is set in the vehicle is shown in a perspective view in FIG. 4.

Figure 4:
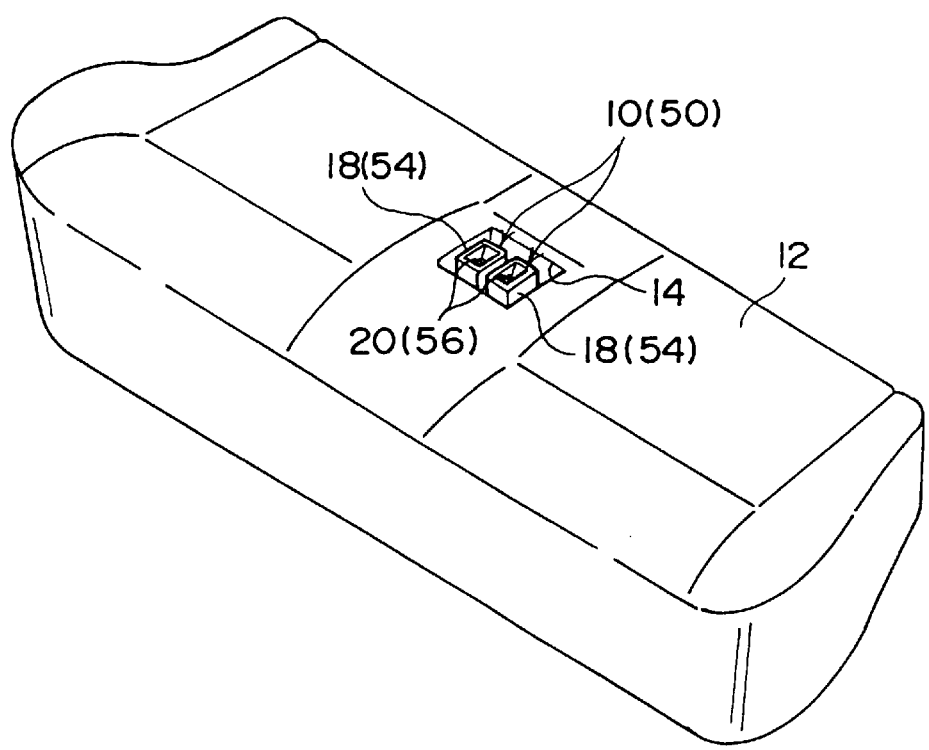
FIG. 4 is a perspective view showing a state in which the buckle device relating to the first embodiment of the present invention is set in the vehicle.

A pair of the buckle devices 10 relating to the present invention are set in a hollow portion 14 formed in a longitudinal direction center of a rear seat 12 in a vehicle (see FIG. 4). A pair of webbings (not shown) for restraining vehicle occupants are provided at the rear seat 12. A tongue plate (not shown) is attached to each webbing.

The buckle device 10 is provided with a buckle member 16. The buckle member 16 has a buckle 18 at the upper portion thereof. An insertion hole 20 is formed in the upper portion of the buckle 18. The tongue plate is inserted into the insertion hole 20.

The buckle member 16 has, at the lower portion thereof, a plate anchor inner 22 serving as a linking portion. The plate anchor inner 22 is formed in the shape of a long plate. A substantially solid cylindrical rivet 24, which serves as a rotating shaft, passes through the lower portion of the plate anchor inner 22, and the plate anchor inner 22 can swivel with respect to the rivet 24. A retention hole 26 is formed in the plate anchor inner 22. The retention hole 26 corresponds to a first end portion 38B of a torsion coil spring 38 which will be described later.

A bracket 28, which serves as a supporting member, is fixed to the floor surface (not shown) in the vehicle so as to correspond to the buckle member 16. An elongated hole 30 is formed in the bracket 28. The elongated hole 30 is formed along the vertical direction of the vehicle (the direction substantially orthogonal to the top surface of the rear seat). By carrying out so-called burring on the elongated hole 30, a thick portion 32 is formed at the peripheral edge of the elongated hole 30 of the bracket 28. The thickness of the thick portion 32 is greater than the thickness of regions of the bracket 28 other than at the periphery of the elongated hole 30.

The rivet 24 is inserted through the elongated hole 30 of the bracket 28. The plate anchor inner 22 can thereby swivel around the rivet 24. Thus, the buckle member 16 is supported so as to swivel at the bracket 28. At the same time, the rivet 24 is movable between the top end and the bottom end of the elongated hole 30. Therefore, the buckle member 16 is slidably supported at the bracket 28.

An abutment portion 34 is formed at the upper portion of the bracket 28. When the plate anchor inner 22 abuts the abutment portion 34, rotation of the buckle member 16 is impeded, and the buckle 16 is disposed at a swiveling position at which the buckle 16 stands. Further, an engagement portion 36 is formed at the upper portion of the bracket 28. The engagement portion 36 corresponds to a second end portion 38C of the torsion coil spring 38 which will be described later.

The torsion coil spring 38 is disposed between the bracket 28 and the plate anchor inner 22. The torsion coil spring 38 has a helical spring portion 38A. The rivet 24 is inserted through the interior of the spring portion 38A. The first end portion 38B of the torsion coil spring 38 extends from the spring portion 38A on a tangent line of the spring portion 38A. The distal end of the first end portion 38B is bent and retained in the retention hole 26 of the plate anchor inner 22. Moreover, the second end portion 38C of the torsion coil spring 38 extends from the spring portion 38A on a tangent line of the spring portion 38A. The second end portion 38C slidably engages with the engagement portion 36 of the bracket 28.

In this way, the torsion coil spring 38 applies urging force to the buckle member 16. Due to this urging force, the rivet 24 abuts the upper end of the elongated hole 30, and the buckle member 16 is disposed at the position which is the upper limit of sliding. At the same time, the plate anchor inner 22 is abutted by the abutment portion 34 of the bracket 28, and the buckle member 16 is disposed at the swiveling position at which the buckle member 16 stands.

The rivet 24 passes through annular washers 40 which are provided at the outer side of the plate anchor inner 22 (the side opposite the surface which contacts the torsion coil spring 38) and at the outer side of the bracket 28 (the side opposite the surface which contacts the torsion coil spring 38). The buckle member 16 can thereby slide and rotate even more smoothly with respect to the bracket 28.

Next, operation of the present embodiment will be described.

In the buckle device 10 having the above-described structure, the buckle 18 is provided at the upper portion of the buckle member 16, and the plate anchor inner 22 is provided at the lower portion of the buckle member 16. Due to the rivet 24, which passes through the plate anchor inner 22, being inserted through the elongated hole 30 of the bracket 28, the bracket 28 supports the buckle member 16 such that the buckle member 16 can slide and swivel.

Here, due to the torsion coil spring 38 applying urging force to the buckle member 16, the rivet 24 abuts the upper end of the elongated hole 30, and the buckle member 16 is disposed at the position which is the upper limit of sliding. The buckle member 16 (the plate anchor inner 22) is abutted to the abutment portion 34, and the buckle member 16 is disposed at the swiveling position at which the buckle member 16 stands. In this way, when the tongue plate (not shown), which is attached to the unillustrated webbing for restraining a vehicle occupant, is inserted into the insertion hole 20 of the buckle 18, there is no need for the vehicle occupant to hold the buckle 18 with his/her hand, and the usability improves.

When downward pressing force of a given amount or more is applied to the buckle member 16, the rivet 24 moves toward the lower end of the elongated hole 30 against the urging force of the torsion coil spring 38, and the second end portion 38C of the torsion coil spring 38 slides on the engagement portion 36 of the bracket 28, and the buckle member 16 is slid downward (refer to the two-dot chain line in FIGS. 1 and 2). On the other hand, when application of downward urging force on the buckle member 16 is released, the buckle member 16 returns to the position which is the upper limit of sliding (the initial position) due to the urging force of the torsion coil spring 38. Namely, when a vehicle occupant sits on the rear seat 12, the buckle 18 is pressed downward by the buttocks of the vehicle occupant, and the buckle 18 does not project from the top surface of the rear seat 12. Thus, the seating comfort of the vehicle occupant can be improved.

Further, when swiveling force is applied to the buckle member 16, the buckle member 16 is swiveled around the rivet 24 against the urging force of the torsion coil spring 38 (refer to the one-dot chain line in FIG. 1). On the other hand, when the application of swiveling force to the buckle member 16 is released, the buckle member 16 returns to the swiveling position at which the buckle member 16 stands (the initial position) due to the urging force of the torsion coil spring 38. Namely, when a seat movement, such as a sliding operation or the like, of the rear seat 12 is carried out, the buckle member 16 swivels so as to correspond to the seat movement.

Moreover, the buckle member 16 can be returned to its initial position merely by the torsion coil spring 38. Thus, the buckle device 10 can be made to be a simple structure.

Further, here, at the time of adjusting the anti-sliding force or the anti-swiveling force (torque) of the buckle member 16, it suffices to adjust the position at which the engagement portion 36 is set at the bracket 28 or to adjust the urging force of the torsion coil spring 38. Thus, the anti-sliding force or the anti-swiveling force can easily be adjusted.

Moreover, in order to adjust the sliding length (stroke) of the buckle member 16, other than adjusting the length of the elongated hole 30 formed in the bracket 28, the position at which the engagement portion 36 is set at the bracket 28 may be adjusted. Thus, the sliding length can easily be adjusted. While the projecting of the second end portion 38C of the torsion coil spring 38 from the buckle member 16 (the side portion of the plate anchor inner 22) is suppressed, the sliding length can be made long and the buckle device 10 can be prevented from becoming large.

The thick portion 32, which is thick as compared to the regions of the bracket 28 other than the periphery of the elongated hole 30, is formed at the periphery of the elongated hole 30 of the bracket 28. The rigidity of the bracket 28 at the elongated hole 30 can thereby be made high. Thus, even in cases such as when the elongated hole 30 is made long in order to increase the sliding length of the buckle member 16, deformation of the bracket 28 (e.g., deformation such as the width of the elongated hole 30 increasing) can be prevented. At the same time, there is no need to provide a separate reinforcing member for increasing the rigidity of the bracket 28 at the elongated hole 30, and the number of parts can be reduced.

Further, because the buckle device 10 is set in the hollow portion 14 formed in the rear seat 12, the buckle device 10 can be accommodated in the rear seat 12, and the appearance can be improved.

Second Embodiment

Figure 5:
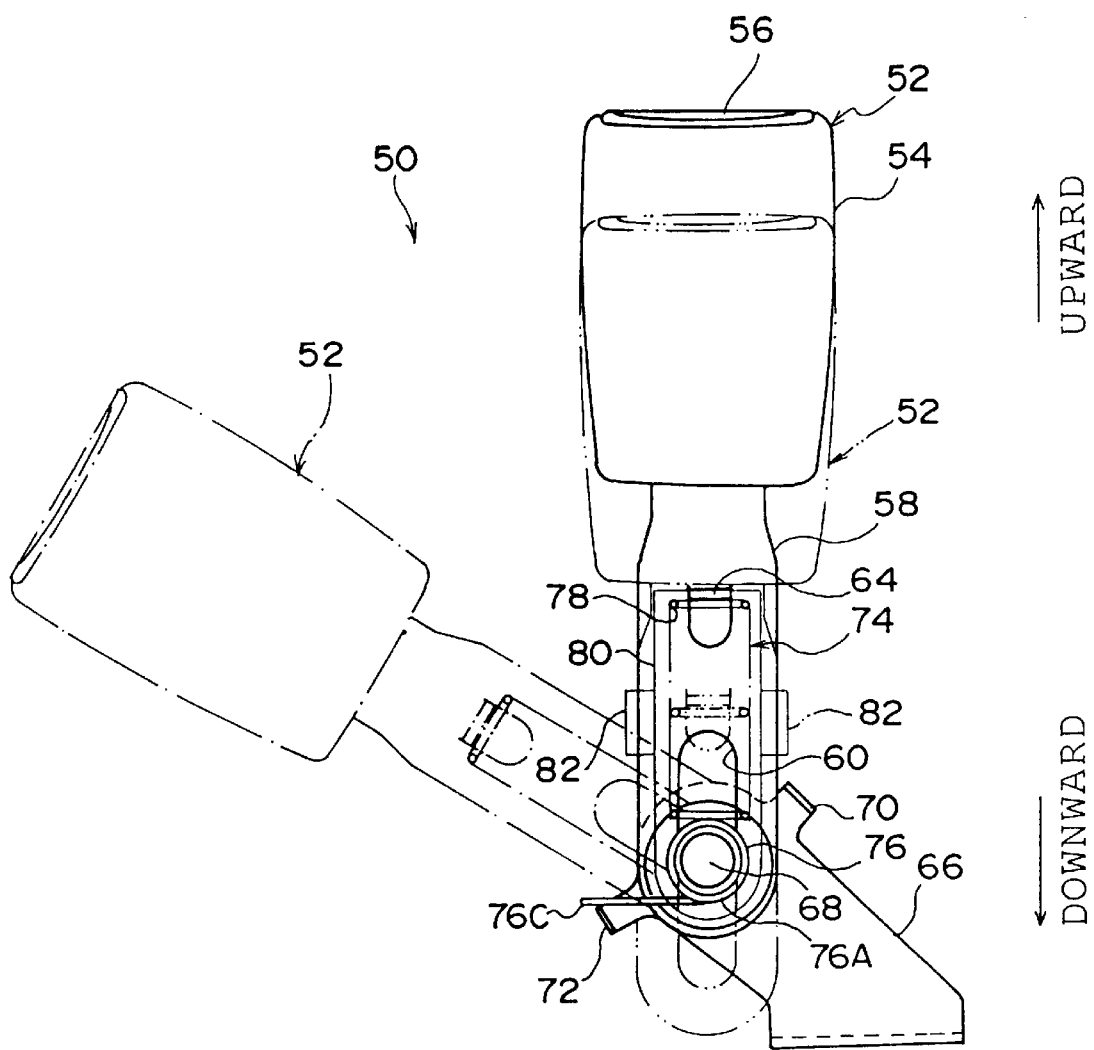
FIG. 5 is a side view, as seen from a side of a vehicle, showing a buckle device relating to a second embodiment of the present invention.
Figure 6:
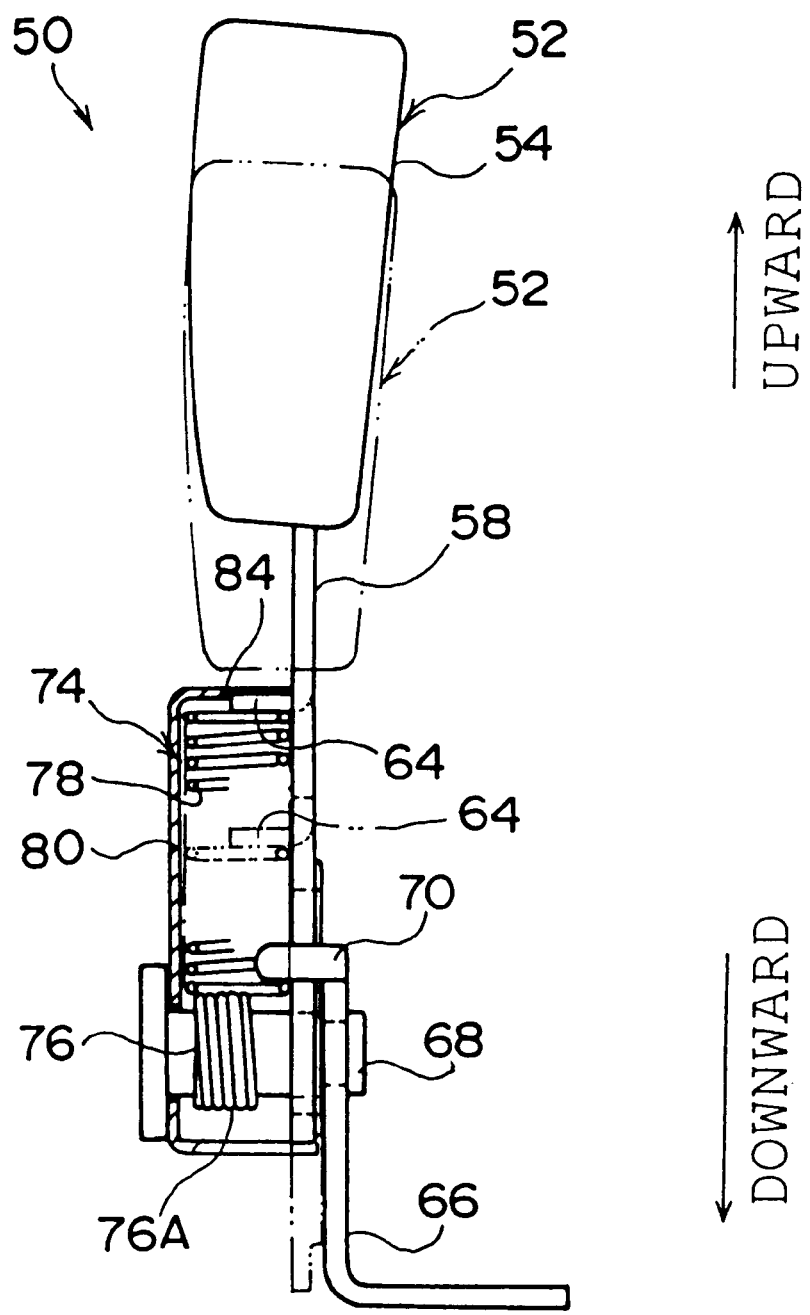
FIG. 6 is a side view, as seen from the front of the vehicle, showing the buckle device relating to the second embodiment of the present invention.
Figure 7:
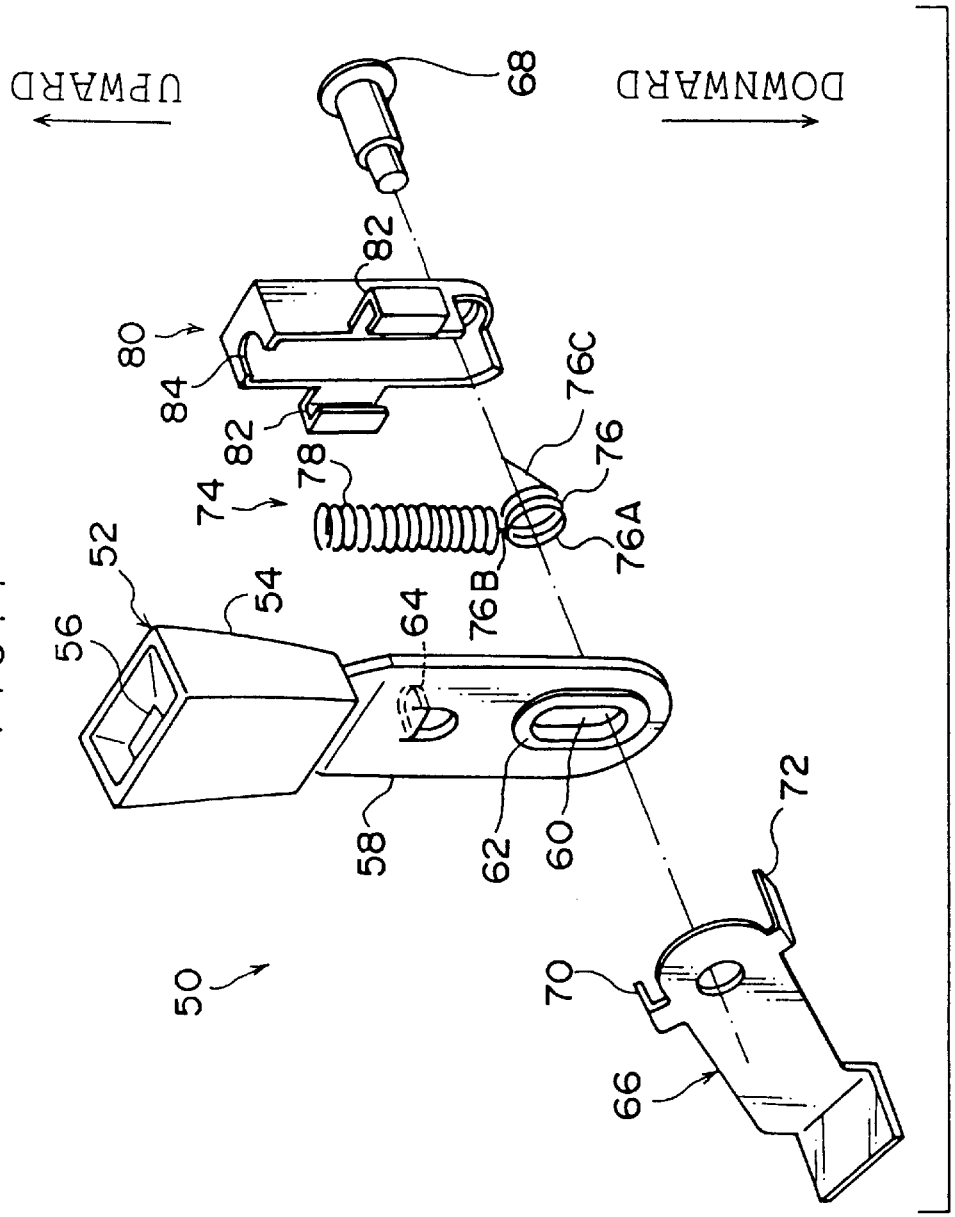
FIG. 7 is an exploded perspective view showing the buckle device relating to the second embodiment of the present invention.

A buckle device 50 relating to a second embodiment of the present invention is shown in FIG. 5 in a side view seen from a side of a vehicle. The buckle device 50 is shown in FIG. 6 in a side view seen from the front of the vehicle. Further, the buckle device 50 is shown in an exploded perspective view in FIG. 7.

In the same way as the buckle device 10 of the above-described first embodiment, a pair of the buckle devices 50 relating to the present embodiment are set in the hollow portion 14 formed in a longitudinal direction center of the rear seat 12 in a vehicle (see FIG. 4). A pair of webbings (not shown) for restraining vehicle occupants are provided at the rear seat 12. A tongue plate (not shown) is attached to each webbing.

The buckle device 50 is provided with a buckle member 52. The buckle member 52 has a buckle 54 at the upper portion thereof. An insertion hole 56 is formed in the upper portion of the buckle 54. The tongue plate is inserted into the insertion hole 56.

The buckle member 52 has, at the lower portion thereof, a plate anchor inner 58 serving as a linking portion. The plate anchor inner 58 is formed in the shape of a long plate. An elongated hole 60 is formed in the lower side portion of the plate anchor inner 58. The elongated hole 60 is formed along the vertical direction of the vehicle (the direction substantially orthogonal to the top surface of the rear seat). By carrying out so-called burring on the elongated hole 60, a thick portion 62 is formed at the peripheral edge of the elongated hole 60 of the plate anchor inner 58. The thickness of the thick portion 62 is greater than the thickness of regions of the plate anchor inner 58 other than at the periphery of the elongated hole 60. A semielliptic retaining portion 64 is formed by so-called punch-bending in the plate anchor inner 58 above the elongated hole 60. The retaining portion 64 is formed to be small so as to not lower the rigidity of the plate anchor inner 58.

A bracket 66, which serves as a supporting member, is fixed to the floor surface (not shown) in the vehicle so as to correspond to the buckle member 52. A substantially solid cylindrical rivet 68, which serves as a rotating shaft, is supported at the bracket 66, and the rivet 68 can rotate with respect to the bracket 66. The rivet 68 is inserted through the elongated hole 60 of the plate anchor inner 58. In this way, the plate anchor inner 58 can swivel around the rivet 68. Thus, the buckle member 52 is supported so as to swivel at the bracket 66. At the same time, the rivet 68 is movable between the top end and the bottom end of the elongated hole 60. Therefore, the buckle member 52 is slidably supported at the bracket 66.

An abutment portion 70 is formed at the upper portion of the bracket 66. When the plate anchor inner 58 abuts the abutment portion 70, rotation of the buckle member 52 is impeded, and the buckle member 52 is disposed at a swiveling position at which the buckle member 52 stands. Further, an engagement portion 72 is formed at the upper portion of the bracket 66. The engagement portion 72 corresponds to a second end portion 76C of a torsion coil spring 76 which will be described later.

A spring member 74 is disposed at the retaining portion 64 side of the plate anchor inner 58. The spring member 74 has, at the lower portion thereof, the torsion coil spring 76. The torsion coil spring 76 has a helical spring portion 76A, and the rivet 68 is inserted through the interior of this spring portion 76A. The spring member 74 has, above the torsion coil spring 76, a helical compression coil spring 78. The lower end of the compression coil spring 78 is linked with a first end portion 76B of the torsion coil spring 76.

Figure 8:
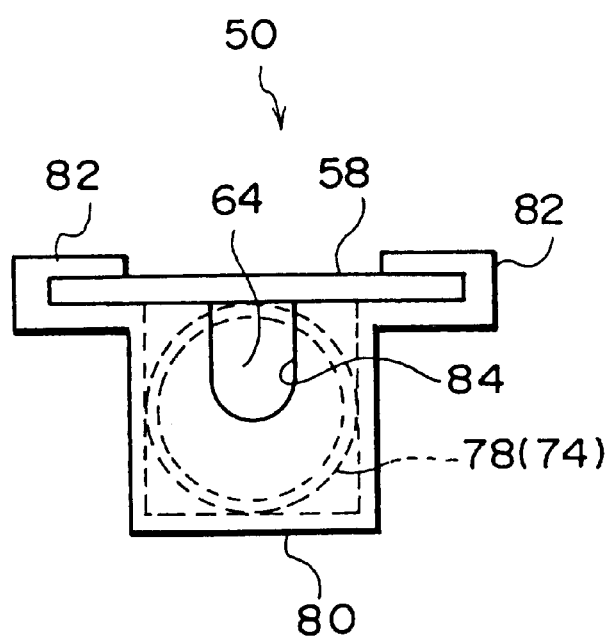
FIG. 8 is a plan view showing a plate anchor inner, a compressed coil spring, a case member, and the like of the buckle device relating to the second embodiment of the present invention.

The upper end of the compression coil spring 78 is retained by the retaining portion 64 of the plate anchor inner 58. In this way, the compression coil spring 78 applies urging force to the buckle member 52. Further, due to this urging force, the rivet 68 abuts the lower end of the elongated hole 60, and the buckle member 52 is disposed at the position which is the upper limit of sliding. Further, as shown in FIG. 8, the distal end of the retaining portion 64 is disposed on the central axis of the compression coil spring 78. Thus, the retaining portion 64 retains the compression coil spring 78 only at one portion of the upper end thereof.

The second end portion 76C of the torsion coil spring 76 extends from the spring portion 76A on a tangent line of the spring portion 76A, and is engaged with the engagement portion 72 of the bracket 66. The torsion coil spring 76 thereby applies urging force to the buckle member 52, and the plate anchor inner 58 abuts the abutment portion 70 of the bracket 66, and the buckle member 52 is disposed at the swiveling position at which the buckle member 52 stands.

A case member 80 is provided at the side wall at the spring member 74 side of the plate anchor inner 58. The case member 80 is formed in a substantially rectangular parallelepiped shape. The wall surface of the case member 80 at the plate anchor inner 58 side is opened. The spring member 74 (the compression coil spring 78 and the torsion coil spring 76) is accommodated in the case member 80. The rivet 68 is inserted through the lower portion of the case member 80. The case member 80 is attached to the plate anchor inner 58 such that the plate anchor inner 58 can slide in the vertical direction with respect to the case member 80. As shown in FIG. 8, the peripheral portion of the compression coil spring 78 contacts the three inner wall surfaces of the case member 80 and the plate anchor inner 58. In this way, buckling, which accompanies contraction of the compression coil spring 78, can be prevented.

A pair of guiding portions 82 are provided at the side walls of the case member 80 in a state of projecting along the widthwise direction of the plate anchor inner 58. Each guiding portion 82 is formed in a substantial U-shape in cross-section, and the plate anchor inner 58 is fit in the interiors thereof. In this way, the case member 80 can be prevented even more from coming apart from the plate anchor inner 58, and buckling accompanying contraction of the compression coil spring 78 can be prevented even more reliably. Further, a fit-in hole 84 is formed in the top wall of the case member 80, and the retaining portion 64 of the plate anchor inner 58 is fit into the fit-in hole 84.

Next, operation of the present embodiment will be described.

In the buckle device 50 having the above-described structure, the buckle member 52 has the buckle 54 at the upper portion thereof, and has the plate anchor inner 58 at the lower portion thereof. Due to the rivet 68, which is supported by the bracket 66, being inserted through the elongated hole 60 of the plate anchor inner 58, the bracket 66 supports the buckle member 52 such that the buckle member 52 can slide and swivel.

Here, due to the compression coil spring 78 of the spring member 74 applying urging force to the buckle member 52, the rivet 68 abuts the lower end of the elongated hole 60, and the buckle member 52 is disposed at the position which is the upper limit of sliding. Due to the torsion coil spring 76 of the spring member 74 applying urging force to the buckle member 52, the buckle member 52 (the plate anchor inner 58) is abutted to the abutment portion 70, and the buckle member 52 is disposed at the swiveling position at which the buckle member 52 stands. In this way, when the tongue plate (not shown) which is attached to the unillustrated webbing for restraining a vehicle occupant is inserted into the buckle 54, there is no need for the vehicle occupant to hold the buckle 54 with his/her hand, and the usability improves.

Further, when downward pressing force of a given amount or more is applied to the buckle member 52, the rivet 68 moves toward the upper end of the elongated hole 60 against the urging force of the compression coil spring 78, and the buckle member 52 is slid downward (refer to the two-dot chain line in FIGS. 5 and 6). On the other hand, when application of downward urging force on the buckle member 52 is released, the buckle member 52 returns to the position which is the upper limit of sliding due to the urging force of the compression coil spring 78. Namely, when a vehicle occupant sits on the rear seat 12, the buckle 54 is pressed downward by the buttocks of the vehicle occupant, and the buckle 54 does not project from the top surface of the rear seat 12. Thus, the seating comfort of the vehicle occupant can be improved.

Further, when swiveling force is applied to the buckle member 52, the buckle member 52 is swiveled around the rivet 68 against the urging force of the torsion coil spring 76 (refer to the one-dot chain line in FIG. 5). On the other hand, when the application of swiveling force to the buckle member 52 is released, the buckle member 52 returns to the swiveling position at which the buckle member 52 stands (the initial position) due to the urging force of the torsion coil spring 76. Namely, when a seat movement, such as a sliding operation or the like, of the rear seat 12 is carried out, the buckle member 52 swivels and can correspond to the seat movement.

Due to the compression coil spring 78 being accommodated in the case member 80, buckling, which accompanies contraction of the compression coil spring 78, is prevented by the case member 80. Thus, as in the present embodiment, the retaining portion 64, which is formed by punch-bending, is made small in order to suppress a lowering of the rigidity of the plate anchor inner 58. Even in cases such as when the retaining portion 64 cannot press the upper end side of the compression coil spring 78 uniformly, proper urging force of the compression coil spring 78 can be applied to the buckle member 52. Further, because the spring member 74 (the compression coil spring 78 and the torsion coil spring 76) is accommodated in the case member 80, foreign matter, such as dust or the like, can be prevented from adhering to the spring member 74.

At the time of adjusting the anti-sliding force of the buckle member 52, the position at which the retaining portion 64 is formed at the plate anchor inner 58 may be adjusted, or the urging force of the compression coil spring 78 may be adjusted. Further, at the time of adjusting the anti-swiveling force (torque) of the buckle member 52, the position at which the engagement portion 72 is set at the bracket 66 may be adjusted, or the urging force of the torsion coil spring 76 may be adjusted. Thus, the anti-sliding force and the anti-swiveling force can be easily adjusted. Further, the anti-sliding force and the anti-swiveling force can be adjusted independently, and can be adjusted with high accuracy.

Moreover, in order to adjust the sliding length (stroke) of the buckle member 52, other than adjusting the length of the elongated hole 60 formed in the plate anchor inner 58, the position at which the engagement portion 72 is set at the bracket 66 may be adjusted. Thus, the sliding length can easily be adjusted. While the projecting of the second end portion 76C of the torsion coil spring 76 from the buckle member 52 (the side portion of the plate anchor inner 58) is suppressed, the sliding length can be made long and the buckle device 50 can be prevented from becoming large.

The thick portion 62, which is thick as compared to the regions of the plate anchor inner 58 other than the periphery of the elongated hole 60, is formed at the periphery of the elongated hole 60 of the plate anchor inner 58. Therefore, the rigidity of the plate anchor inner 58 at the elongated hole 60 can be made high. At the same time, even in cases such as when the elongated hole 60 is made long in order to increase the sliding length of the buckle member 52, deformation of the plate anchor inner 58 (e.g., deformation such as the width of the elongated hole 60 increasing) can be prevented. Thus, there is no need to provide a separate reinforcing member for increasing the rigidity of the bracket 66 at the elongated hole 60, and the number of parts can be reduced.

Further, because the buckle device 50 is set in the hollow portion 14 formed in the rear seat 12, the buckle device 50 can be accommodated in the rear seat 12, and the appearance can be improved.

In the present embodiment, the retaining portion 64 is disposed above the elongated hole 60 at the plate anchor inner 58, and corresponding thereto, the compression coil spring 78 is disposed above the torsion coil spring 76. However, the retaining portion may be disposed beneath the elongated hole at the plate anchor inner (the linking portion), and corresponding thereto, the compression coil spring may be disposed beneath the torsion coil spring.

What is claimed is:

1. A buckle device which is disposed at a seat in a vehicle, and into which a tongue plate, which is attached to a webbing for restraining a vehicle occupant, is inserted, the buckle device comprising:

a buckle member having, at an upper portion of the buckle member, a buckle into which the tongue plate is inserted, and having, at a lower portion of the buckle member, a linking portion in which an elongated hole is formed along a vertical direction of the vehicle and in which a retaining portion is formed at one of an upper side and a lower side of the elongated hole;

a supporting member which is fixed within the vehicle so as to correspond to the buckle member, and provided with a rotating shaft which is inserted through the elongated hole of the linking portion, the linking portion being supported so as to swivel around the rotating shaft such that the buckle member can swivel, and the rotating shaft being movable between an upper end and a lower end of the elongated hole, so that the supporting member supports the buckle member slidably;

an abutment portion which is provided at the supporting member, and which abuts the buckle member and prevents swivel of the buckle member in a state in which the buckle member is at a swiveling position at which the buckle member stands;

a spring member having a torsion coil spring and a compression coil spring, the torsion coil spring having a helical spring portion, the rotating shaft being inserted through an interior of the spring portion, the compression coil spring being formed in a helical shape, one end of the compression coil spring being retained at the retaining portion, and another end of the compression coil spring being linked to a first end portion of the torsion coil spring, and the compression coil spring applies urging force to the buckle member and makes the rotating shaft abut the lower end of the elongated hole;

an engagement portion which is provided at the supporting member, and due to a second end portion of the torsion coil spring engaging with the engagement portion, the torsion coil spring applies urging force to the buckle member and makes the buckle member abut the abutment portion; and a case member which is provided so as to accommodate the compression coil spring, and which prevents buckling which accompanies compression of the compression coil spring.

2. The buckle device according to claim 1, further comprising a thick portion which is formed at a peripheral edge of the elongated hole of the linking portion, and whose thickness is greater than a thickness of regions of the supporting member other than the peripheral edge of the elongated hole.

3. The buckle device according to claim 2, wherein when the buckle device is used at a rear seat of the vehicle, the buckle device can be accommodated in the rear seat.

4. The buckle device according to claim 2, wherein the case member has a guiding portion.

5. The buckle device according to claim 4, wherein the buckle member is fit into the guiding portion of the case member.

6. The buckle device according to claim 5, wherein the buckle member is disposed between the supporting member and the case member.

7. The buckle device according to claim 6, wherein the abutment portion and the engagement portion are provided integrally with the supporting member, and are disposed at positions which substantially oppose one another.

8. The buckle device according to claim 7, wherein the buckle member is disposed between the abutment portion and the engagement portion.

9. A buckle device which is disposed at a seat in a vehicle, and into which a tongue plate, which is attached to a webbing for restraining a vehicle occupant, is inserted, the buckle device comprising:

a buckle member having, at an upper portion of the buckle member, a buckle into which the tongue plate is inserted, and having, at a lower portion of the buckle member, a linking portion in which an elongated hole is formed along a vertical direction of the vehicle and in which a retaining portion is formed at one of an upper side and a lower side of the elongated hole;

a supporting member which is fixed within the vehicle so as to correspond to the buckle member, and provided with a rotating shaft which is inserted through the elongated hole of the linking portion, the linking portion being supported so as to swivel around the rotating shaft such that the buckle member can swivel, and the rotating shaft being movable between an upper end and a lower end of the elongated hole so that the supporting member supports the buckle member slidably;

an abutment portion which is provided at the supporting member, and which abuts the buckle member and prevents swiveling of the buckle member in a state in which the buckle member is at a swiveling position at which the buckle member stands;

a spring member having a torsion coil spring and a compression coil spring, the torsion coil spring having a helical spring portion, the rotating shaft being inserted through an interior of the spring portion, the compression coil spring being formed in a helical shape, one end of the compression coil spring being retained at the retaining portion, and another end of the compression coil spring being linked to a first end portion of the torsion coil spring, and the compression coil spring applies urging force to the buckle member and makes the rotating shaft abut the lower end of the elongated hole;

an engagement portion which is provided at the supporting member, and due to a second end portion of the torsion coil spring engaging with the engagement portion, the torsion coil spring applies urging force to the buckle member and makes the buckle member abut the abutment portion; and a thick portion which is formed at a peripheral edge of the elongated hole of the linking portion, and whose thickness is greater than a thickness of regions of the linking portion other than the peripheral edge of the elongated hole.

10. The buckle device according to claim 9, wherein when the buckle device is used at a rear seat of the vehicle, the buckle device can be accommodated in the rear seat.

11. The buckle device according to claim 9, further comprising a case member which is provided so as to accommodate the compression coil spring, and which prevents buckling which accompanies compression of the compression coil spring.

12. The buckle device according to claim 11, wherein the case member has a guiding portion.

13. The buckle device according to claim 12, wherein the buckle member is fit into the guiding portion of the case member.

14. The buckle device according to claim 13, wherein the buckle member is disposed between the supporting member and the case member.

* * * * *